US008990417B2

(12) United States Patent
Groh et al.

(10) Patent No.: US 8,990,417 B2
(45) Date of Patent: Mar. 24, 2015

(54) PEER-TO-PEER TRANSMISSION SYSTEM FOR DATA STREAMS

(75) Inventors: Jens Groh, Munich (DE); Matthias Hammer, Munich (DE); Alexander Erk, Ismaning (DE); Klaus Merkel, Munich (DE); Sebastian Kilger, Munich (DE); Mark Gulbahar, Landshut (DE); Robert Sedlmeyer, Ismaning (DE)

(73) Assignee: Institut fur Rundfunktechnik GmbH, Munich (DE)

( * ) Notice: Subject to any disclaimer, the term of this patent is extended or adjusted under 35 U.S.C. 154(b) by 270 days.

(21) Appl. No.: 13/321,148

(22) PCT Filed: May 18, 2010

(86) PCT No.: PCT/EP2010/056826
§ 371 (c)(1), (2), (4) Date: Feb. 20, 2012

(87) PCT Pub. No.: WO2010/133599
PCT Pub. Date: Nov. 25, 2010

(65) Prior Publication Data
US 2012/0151081 A1 Jun. 14, 2012

(30) Foreign Application Priority Data

May 20, 2009 (DE) .......................... 10 2009 022 207

(51) Int. Cl.
G06F 15/16 (2006.01)
H04L 29/08 (2006.01)

(52) U.S. Cl.
CPC ............ H04L 67/104 (2013.01); H04L 67/108 (2013.01)
USPC ........... 709/231; 709/217; 709/219; 709/223; 709/224; 709/226

(58) Field of Classification Search
CPC ................... H04L 29/08306; H04L 29/08477; H04L 67/104; H04L 67/108; G06F 17/30206; G06F 17/30209; H04N 21/632
USPC .................. 709/217, 219, 223, 224, 226, 231
See application file for complete search history.

(56) References Cited

U.S. PATENT DOCUMENTS

2002/0095559 A1* 7/2002 Mekhiel ........................ 711/168
2002/0162109 A1 10/2002 Shteyn (Continued)

FOREIGN PATENT DOCUMENTS

WO WO2006/126143 5/2006

OTHER PUBLICATIONS

International Search Report for PCT/EP2010/056826 dated Aug. 17, 2010.

Primary Examiner — Liangche A Wang
Assistant Examiner — Johnny Aguiar
(74) Attorney, Agent, or Firm — Workman Nydegger

(57) ABSTRACT

In a peer-to-peer (P2P) system, in each individual transmitting peer (10), the incoming data stream is divided logically and with regard to time into different parts, which are buffered in a volatile memory (13) and are transmitted to the receiving peers (20, 30) on different paths by means of a peer-to-peer transmission mechanism (40). In a receiving peer (20), the received parts of the subdivided data stream are buffered in a volatile memory (21) and are reassembled into a complete data stream. Further, in the receiving peer (20), the parts of the subdivided data stream, buffered by the volatile memory (21), are copied into a persistent memory (22), from where they are copied back into the volatile memory (21) at a later point in time if necessary. A fraction of the received data is excluded from persistent storing by selecting parts of the subdivided data stream.

6 Claims, 3 Drawing Sheets

(56) References Cited

U.S. PATENT DOCUMENTS

| | | | |
|---|---|---|---|
| 2003/0204602 A1 | 10/2003 | Hudson et al. | |
| 2006/0230107 A1* | 10/2006 | Yu et al. | 709/204 |
| 2007/0266169 A1* | 11/2007 | Chen et al. | 709/231 |
| 2008/0133767 A1* | 6/2008 | Birrer et al. | 709/231 |
| 2008/0256246 A1* | 10/2008 | Schlacht et al. | 709/228 |
| 2009/0077254 A1* | 3/2009 | Darcie et al. | 709/231 |
| 2009/0119734 A1* | 5/2009 | Deshpande et al. | 725/118 |
| 2009/0292819 A1* | 11/2009 | Kandekar et al. | 709/231 |

* cited by examiner

PEER-TO-PEER TRANSMISSION SYSTEM FOR DATA STREAMS

CROSS REFERENCE TO RELATED APPLICATIONS

This application is a US nationalization of PCT/EP 2010/056826, filed May 18, 2010, which claims priority to German Application No. DE 10 2009 022 207.3, filed on May 20, 2009, the entire contents of which are incorporated herein by specific reference.

BACKGROUND OF THE INVENTION

1. Field of the Invention

The invention relates to a peer-to-peer transmission for data streams. Such a transmission system is, for example, known from the book "Peer-to-Peer-Systems and Applications" authored by Ralf Steinmetz and Klaus Wehrle, Springer Publishing, 2005, ISBN 3-540-29192-X.

2. Present State of the Art

Peer-to-peer (P2P) systems are network architectures of higher level, consisting of computers having equal rights (Peers), which participate at a collective data transmission and may thereby undertake both receiving and transmitting tasks. The total behavior of the system results from the local interactions between the peers. No central coordination of the interactions between the peers and no central data basis exist. On the contrary, each individual peer merely stores a part of the data present in the entire system and provides the other peers with this part. All stored data are thus available in the entire system. No peer administrates the entire existing content of data.

An example for a known peer-to-peer (P2P) system having a collective of peers 10, 20, 30 and a peer-to-peer transmission mechanism 40 is shown in FIG. 1. A data stream is fed to a transmitting peer 10 via its data input 11 by another peer of the collective. A data partitioner 12 in the transmitting peer 10 logically and with regard to time divides the incoming data stream into different parts, which are buffered in a volatile memory 13 so that the individual parts may be transmitted, on different paths by means of the peer-to-peer transmission mechanism 40, to the receiving peers 20, 30 via connections 41. The peer-to-peer transmission mechanism 40 is a transmission mechanism in a collective of peers, in which the data is distributed from at least one point (transmitting peer) to at least a point (receiving peer) in a non-central manner, namely by forwarding it between receiving peers.

The parts of the subdivided data stream, received from the receiving peer 20 via the connection 41, are therein buffered in a volatile memory 21 and reassembled into a complete data stream, which is available at a data output 23. A semiconductor main memory may, for example, be provided as the volatile memory 21. Further, from the volatile memory 21, the buffered parts of the subdivided data stream may be forwarded to other receiving peers in the collective 30 via the connections 42 and the peer-to-peer mechanism 40, whereby the receiving peer 20 assumes the role of a submitting peer at least partially. The parts of the subdivided data stream, buffered by the volatile memory 21, are further copied into a persistent memory 22 of the receiving peer 20 in order to copy them back into the volatile memory 21 at a later point in time if necessary. A disc drive memory may, for example, be provided as the persistent memory 22. The copied-back parts of the subdivided data stream may in turn be forwarded from the volatile memory 21 to other receiving peers in the collective 30 via the connections 42 and the peer-to-peer transmission mechanism 40, whereby, in this case as well, the receiving peer 20 assumes the role of a transmitting peer at least partially.

SUMMARY OF THE INVENTION

With regard to the above described peer-to-peer (P2P) system, the object of the invention is to reduce the amount of data to be stored persistently.

This object is solved, in accordance with the invention, in that a fraction of the received data is excluded from persistent storing, wherein this exclusion is performed by selecting parts of the subdivided data stream.

Preferably, the excluded fraction is small with regard to the remaining rest of data.

DETAILED DESCRIPTION OF THE PREFERRED EMBODIMENTS

Figure 1:
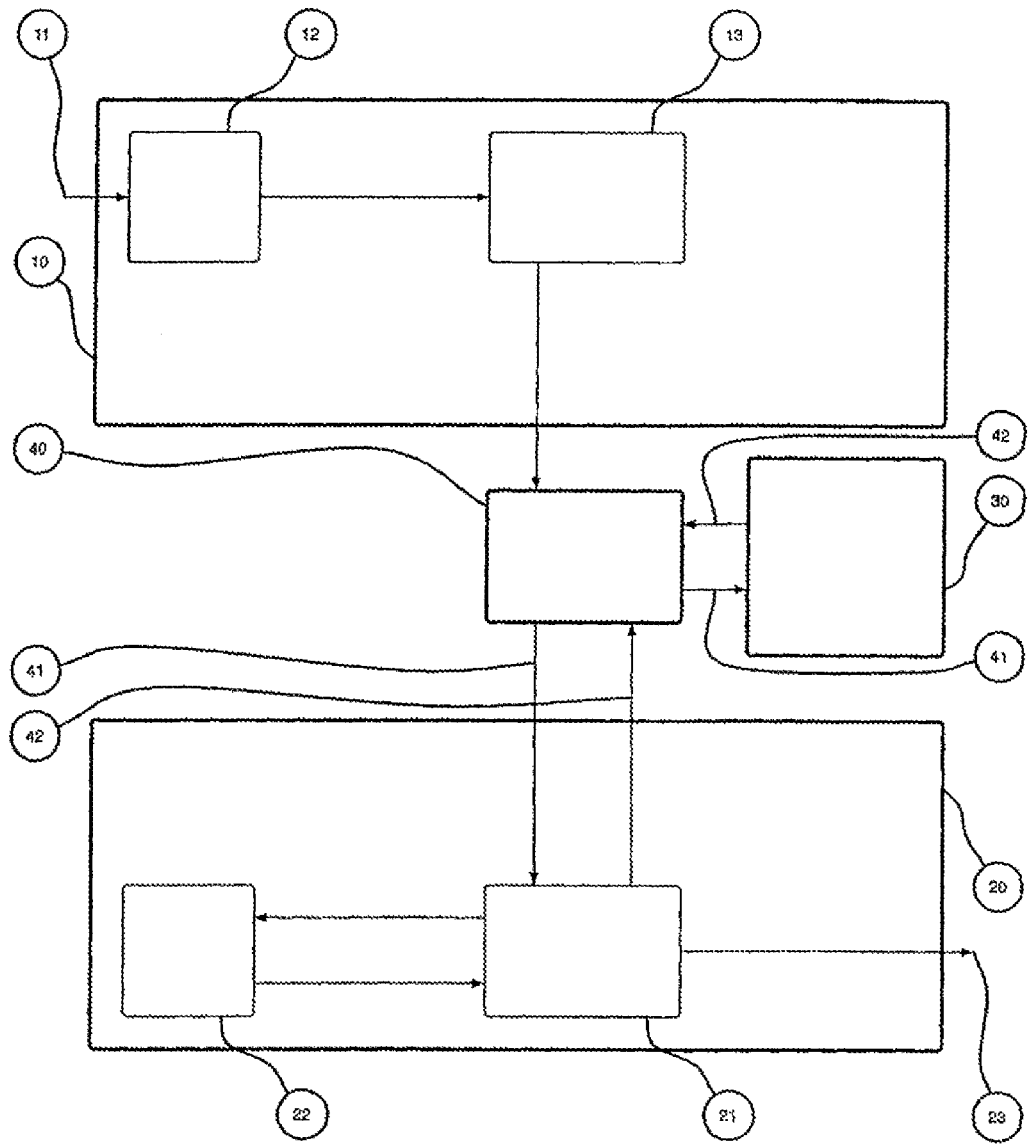
FIG. 1 is a schematic representation of a known peer-to-peer transmission system for data streams.
Figure 2:
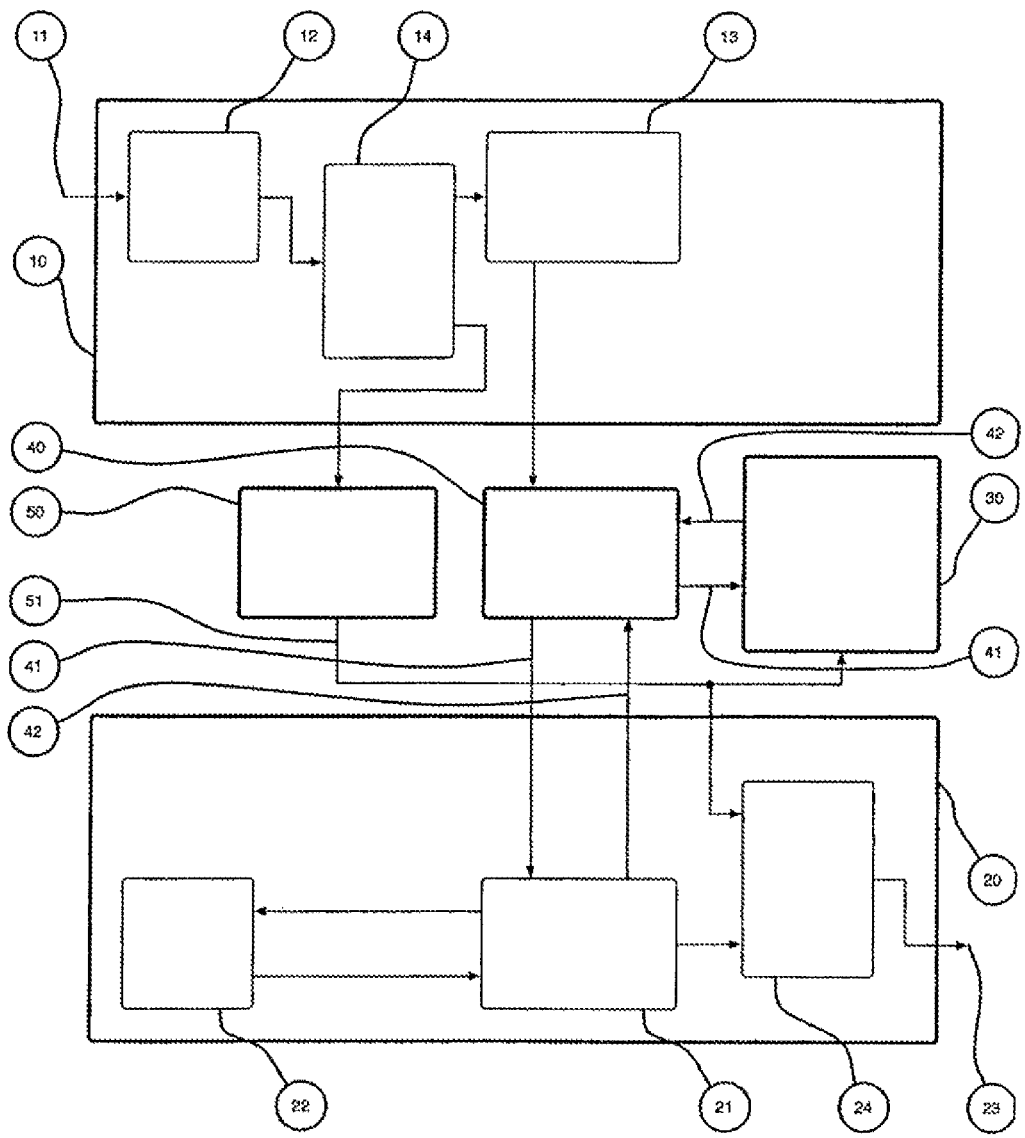
FIGS. 2 and 3 are schematic representation of novel peer-to-peer transmission systems for data streams.
Figure 3:
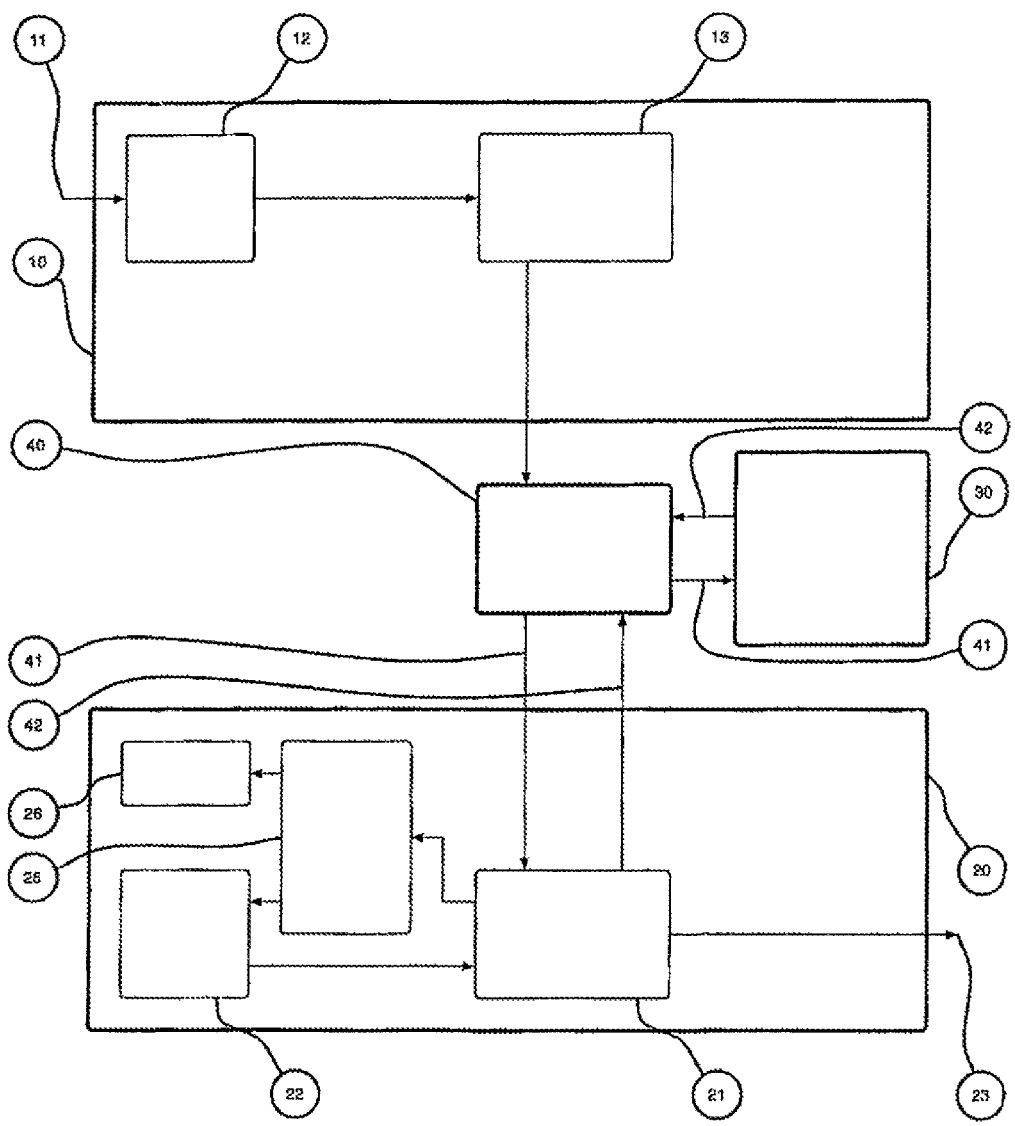

The exclusion of a fraction of the received data from persistent storing according to the invention is described in more detail for two modifications of the system according to FIG. 1 by means of FIGS. 2 and 3.

In the modification according to FIG. 2, the system of FIG. 1 is extended by a second, secondary transmission mechanism. The data of the input data stream subdivided by the data partitioner 12 are fed into a data selector 14, which selects a fraction of the data parts from the subdivided data (data parts). This selected fraction of subdivided data is excluded from buffering in the volatile memory and the subsequent transmission via the mechanism 40 in that the selected fraction is separated from the remaining data of the subdivided data and rerouted into a secondary transmission mechanism 50 by the data selector 14. The remaining data of the subdivided data are, as in FIG. 1, buffered in the volatile memory 13 and therefrom fed into the primary transmission mechanism 40. The selection of the to-be-excluded parts of the subdivided data is determined by a controller in the transmitting peer 10, which is integrated in the data selector 14.

All peers 20, 30 comprise a data combiner 24, which is connected to the secondary transmission mechanism 50 via a connection 51. Via the connection 51, the peers 20, 30 are directly provided with the separated, rerouted fraction of the subdivided data from the transmitting peer 10 if necessary. The data combiner 24 combines the separated, rerouted fraction of the subdivided data with the remaining data of the subdivided data, which have been transmitted in the primary transmission mechanism 40 and buffered in the volatile memory 21. At the output of the data combiner 24 (which represents the data output 23 of the peer 20), the complete data stream of the data subdivided in the peer 10 by the data partitioner 12 is then available.

For the modification according to FIG. 3, the system according to FIG. 1 is provided with a data selector 25 in the receiving peer 20, which selects a fraction from the subdivided data (data parts) buffered in the volatile memory 21. This selected fraction of the subdivided data is separated in the data selector 25 and fed into a deleting unit 26, which deletes the selected fraction. The remaining rest of the buffered, subdivided data (data parts) is fed into the persistent memory 22 by the data selector 25 and a copy thereof is there made. The copied remaining rest is copied back from the persistent memory 22 into the volatile memory 21 at a later point in time if necessary.

The selection of the to-be-excluded fraction of the subdivided data is determined by a controller in the transmitting or in the receiving peer. The selection is determined so that, in each individual receiving peer 20, not the same data parts are affected by the deletion. This unequal selection may be performed by means of a counter or by means of a random generator. In case the receiving peer 20 requires the separated and deleted fraction of the subdivided data at a later point in time, in order to assume the role of a transmitting peer at least partially, then this deleted fraction is again transmitted by means of the peer-to-peer transmission mechanism 40.

What is claimed is:

1. A peer-to-peer transmission system for data streams, comprising:
    a collection of peers having equal rights, and
    a peer-to-peer transmission mechanism,
    wherein a data stream is fed into a transmitting peer from another peer of the collection, having a data partitioner in each transmitting peer, the data partitioner logically or with regard to time divides the data stream into different parts, the different parts of the divided data stream are buffered in a volatile memory and transmitted to the receiving peers on different paths by means of the peer-to-peer transmission mechanism,
    wherein, in a receiving peer, the different parts of the divided data stream are buffered in a volatile memory and reassembled into a complete data stream,
    wherein, in the receiving peer, a fraction of the different parts of the divided data stream, buffered by the volatile memory, is copied into a persistent memory, and
    wherein the fraction of the different parts of the divided data stream, copied into the persistent memory, are copied back into the volatile memory at a later point in time if necessary,
    wherein a second fraction of the different parts of the divided data stream, buffered by the volatile memory, is excluded from persistent storing and is affected by a deletion,
    wherein the exclusion is performed by selecting the second fraction of the different parts of the divided data stream, and the selection of the second fraction of the different parts of the divided data stream is determined by a controller in the transmitting peer or in the receiving peer, wherein for each individual receiving peer, a different portion of the second fraction of the different parts of the divided data stream is affected by the deletion ensuring each of the different parts of the divided data stream is stored in the persistent memory of the collection of peers,
    wherein when the receiving peer requires a separated and a deleted fraction of the divided data stream at a later point in time in order to assume the role of a transmitting peer at least partially, the deleted fraction is again transmitted by means of the peer-to-peer transmission mechanism.

2. The peer-to-peer transmission system according to claim 1, wherein the excluded second fraction of the data stream is small with regard to a remaining rest of the data stream.

3. The peer-to-peer transmission system according to claim 1, wherein, in the transmitting peer, a data selector is provided, the data selector selects a fraction from the divided data stream, wherein the selected fraction of the divided data stream is excluded from buffering in the volatile memory and from the subsequent transmission by the peer-to-peer transmission mechanism, wherein the selected fraction of the divided data stream is separated and rerouted into a secondary transmission mechanism by the data selector.

4. The peer-to-peer transmission system according to claim 3, wherein the controller determining the selection of the second fraction of the divided data stream is integrated in the data selector.

5. The peer-to-peer transmission system according to claim 1, wherein in the receiving peer, a data selector is provided, the data selector selects a fraction from the divided data stream buffered in the volatile memory, the selected fraction from the divided data stream is separated and deleted.

6. The peer-to-peer transmission system according to claim 5, wherein the selection of the second fraction of the different parts of the divided data stream is performed by means of a counter or by means of a random generator.

* * * * *